United States Patent
Lamazure

(10) Patent No.: US 9,288,781 B2
(45) Date of Patent: Mar. 15, 2016

(54) DOWNLINK SIGNALING COUNTER MANAGEMENT FOR MULTIPLE SUBSCRIBER IDENTITY DEVICES

(71) Applicant: ST-Ericsson SA, Plan-les-Ouates (CH)

(72) Inventor: Samuel Lamazure, Moutiers (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 97 days.

(21) Appl. No.: 14/353,662

(22) PCT Filed: Oct. 19, 2012

(86) PCT No.: PCT/EP2012/070737
§ 371 (c)(1),
(2) Date: Apr. 23, 2014

(87) PCT Pub. No.: WO2013/064381
PCT Pub. Date: May 10, 2013

(65) Prior Publication Data
US 2014/0295835 A1     Oct. 2, 2014

Related U.S. Application Data

(60) Provisional application No. 61/562,507, filed on Nov. 22, 2011.

(30) Foreign Application Priority Data

Nov. 4, 2011   (EP) .................................... 11306436

(51) Int. Cl.
*H04W 72/00*     (2009.01)
*H04W 60/04*     (2009.01)
*H04W 60/00*     (2009.01)
*H04W 68/00*     (2009.01)

(52) U.S. Cl.
CPC ............ *H04W 60/04* (2013.01); *H04W 60/005* (2013.01); *H04W 68/00* (2013.01)

(58) Field of Classification Search
USPC ....................................................... 455/452.2
See application file for complete search history.

(56) References Cited

U.S. PATENT DOCUMENTS

2005/0079870 A1   4/2005   Rick et al.
2010/0159929 A1   6/2010   Homchaudhuri

OTHER PUBLICATIONS

3GPP, Global System for Mobile Communications (GSM); "3rd Generation Partnerhip Project; Technical Specification Group GSM/EDGE Radio Access Network; Radio subsystem link control (Release 9)"; 3GPP TS 45.008 V9.5.0; Nov. 2010; pp. 1-145; Valbonne, France.
International Search Report issued in corresponding International application No. PCT/EP2012/070737, date of mailing Feb. 7, 2013.
Written Opinion issued in corresponding International application No. PCT/EP2012/070737, date of mailing Feb. 7, 2013.

*Primary Examiner* — Joel Ajayi
(74) *Attorney, Agent, or Firm* — Patent Portfolio Builders PLLC

(57) ABSTRACT

A downlink signaling counter management method for a communication device is adapted to be simultaneously associated with at least two subscriber identities and to simultaneously provide radio receiving capabilities to less than all of the subscriber identities. For each decoding of a paging block for a subscriber identity, it is determined whether the paging block decoding was correct and whether a previous paging block decoding condition is fulfilled. The downlink signaling counter is updated with different values depending on this determination results, and on whether the paging block decoding was based on a maximum number of paging bursts.

19 Claims, 5 Drawing Sheets

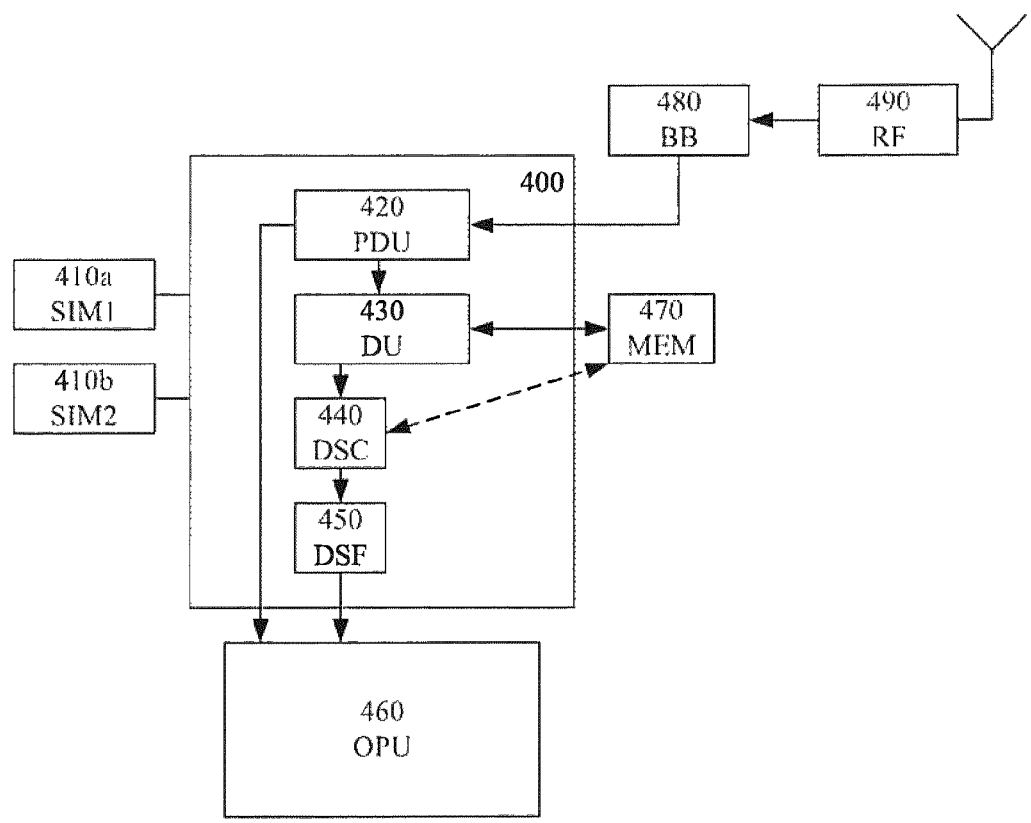
FIG. 4
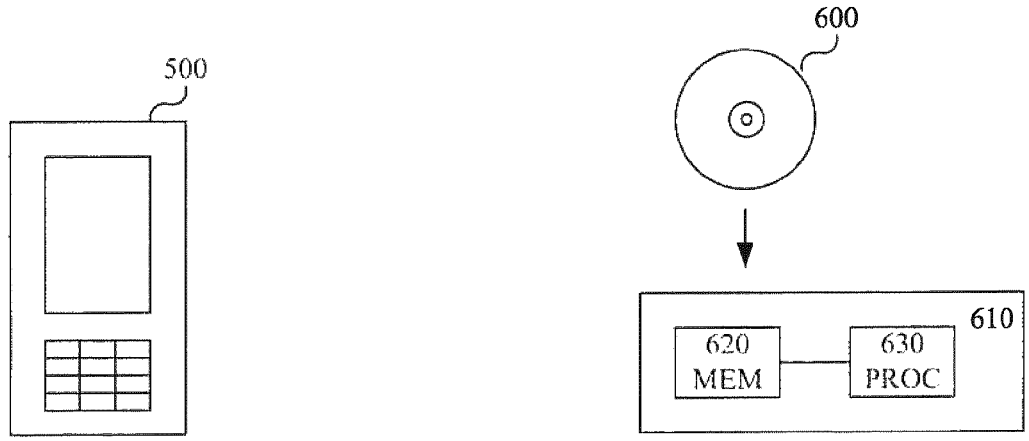
FIG. 5
FIG. 6

DOWNLINK SIGNALING COUNTER MANAGEMENT FOR MULTIPLE SUBSCRIBER IDENTITY DEVICES

TECHNICAL FIELD

The present invention relates generally to the field of downlink signaling counters. More particularly, it relates to downlink signaling counter management for multiple subscriber identity devices.

BACKGROUND

In 3GPP ($3^{rd}$ Generation Partnership Project) GSM (Global System for Mobile communications)/GPRS (General Packet Radio Service)/EDGE (Enhanced Data rate for GSM Evolution) wireless devices associated with a single SIM (subscriber identity module) paging blocks are typically regularly read at periodic well-defined positions when the device is turned on and registered to a network. The paging block reading enables the device to receive and answer to a call initiated by another party (i.e. a Mobile Terminated (MT) call).

The success rate of paging block readings is typically used to monitor the downlink quality. If the downlink quality is too bad, measures should typically be taken to find an alternative (e.g. cell re-selection and/or cell search).

As defined by the 3GPP GSM/GPRS/EDGE recommendations, the downlink quality monitoring may be based on a counter (DSC: Downlink Signaling Counter) in the wireless device. When the wireless device camps in a cell, the DSC is initialized to a specific value related to the paging periodicity as defined in the 3GPP specification (see e.g. 3GPP TS 45.008 Radio subsystem link control (Release 9) v.9.5.0 (2010 November)), section 6.5). The counter is updated at each paging block reading occasion by a value that is based on whether the paging reading was successful or not.

FIG. 1 illustrates a typical method 100 of such DSC handling (see also 3GPP TS45.008 §6.5). In step 110, it is determined whether or not the paging block reading was successful (e.g. if the paging block was correctly decoded). This check may typically be performed by CRC (cyclic redundancy check) or similar.

If the paging block reading was successful (YES path out of block 110) then the DSC is increased by 1 in step 120 and the method returns to step 110 for the next paging block reading. Typically, the DSC is not increased above a maximum value though. Then, if the DSC already has its maximum value, no increase is performed at step 120. The maximum value is typically equal to the specific value to which the DSC is initiated as described above.

If the paging block reading was not successful (NO path out of block 110) then the DSC is decreased by 4 in step 130. Typically, the DSC is not decreased below 0 though. Then, if the DSC already has a value less than 4, the DSC is just set to 0 at step 140.

Then, in step 140, it is determined if the DSC has reached the value 0. If it has not (NO path out of step 140), the method returns to step 110 for the next paging block reading. If DSC has reached the value 0 (YES path out of step 140), then a Downlink Signaling Failure (DSF) event is triggered in step 150, and the process returns to step 110. In good network coverage, the ordinary reselection procedure based on power level monitoring of the serving cell and of the neighboring cells leads to that the number of consecutive badly decoded paging blocks are typically kept at a very low level, and therefore the DSF event is avoided.

The initial value of the DSC is typically defined so that a DSF event is triggered if several consecutive paging blocks are badly decoded during 5 seconds.

The DSF event is used to force measures to be taken that may improve the downlink quality situation. For example, the DSF event may be used to (urgently) force a cell reselection or to trigger a cell search. In some situations, a HPLMN (Home Public Land Mobile Network) neighborhood cell coverage research may be triggered for example. If no new candidate serving cell is found, the SIM is considered to be in "No Service" (having no access to the HPLMN) or in "Limited Service" (having possible access to another PLMN for emergency calls).

When the wireless device is a dual or multi SIM device (e.g. Dual SIM Dual Standby—DSDS, typically having a single radio frequency module and a single baseband module), the situation regarding paging reading and its success is different than in the single SIM situation as will be described in the following. The problem will be exemplified via a DSDS device, but it should be noticed that similar problems arise for any multiple subscriber identity device not capable of providing simultaneous radio access to all of the subscriber identities.

For a dual SIM device, the paging block positions for each of the SIMs could be in conflict.

An example of such a situation is illustrated in FIG. 2A, where the paging block positions 201, 202, 203 of a first SIM 200 completely overlap the paging block positions 211, 212, 213 of a second SIM 210. Zooming in 215 on one of the paging block occasions shows that there is a complete overlap/collision between the 4 paging bursts 204 of the paging block position 201 of the first SIM 200 and the 4 paging bursts 214 of the paging block position 211 of the second SIM 210.

Another example of such a paging block conflict situation is illustrated in FIG. 2C, where the paging block positions 251, 252, 253 of a first SIM 250 partly overlap the paging block positions 261, 262, 263 of a second SIM 260. Zooming in 265 on one of the paging block occasions shows that there is a partial overlap/collision between the 4 paging bursts 254 of the paging block position 251 of the first SIM 250 and the 4 paging bursts 264 of the paging block position 261 of the second SIM 260. It is seen that the last 2 of the paging bursts 254 overlap/collide with the first 2 of the paging bursts 264.

There are also other overlap situations. For example a partial overlap could involve 1 or 3 of the paging bursts of the respective SIMs.

Since the multiple subscriber identity device is not capable of providing simultaneous radio access to all of the subscriber identities, it is not possible in paging occasion conflict situations to attempt or fulfill decoding of all paging blocks for all subscriber identities under the same conditions as in a single SIM situation.

Thus, the DSC handling and the DSF event occurrence may be affected for one or more of the multiple subscriber identities. In example situations, the DSF event may occur too soon or too late compared to a single SIM situation having the same conditions. Alternatively or additionally, the DSF event may occur even when it (according to the signaling quality conditions) should not have occurred at all. Yet alternatively or additionally, the DSF event may not occur at all even when it (according to the signaling quality conditions) should have occurred. This could cause the behavior of one or more SIMs to deviate from the 3GPP GSM recommendations. For example, a cell reselection, a cell search, a "No Service" procedure or a "Limited Service" procedure could wrongfully occur.

For further reference, see also e.g. 3GPP TS45.008 §6.5: "A downlink signaling failure shall result in cell reselection". When a forced cell reselection is triggered, the serving cell is typically black listed in the UE (user equipment) for some time ahead (to avoid switching back too soon). If there is no other available cell in the neighboring cell list of the UE, it will typically try to find a new cell via a cell search procedure, and if no suitable cell is found the UE might typically go into a no service mode.

Hence, there is a need for methods and devices for downlink signaling counter handling in multiple subscriber identity devices that overcome or at least lessen the difference between the DSF event behavior compared to single subscriber identity devices.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and devices for downlink signaling counter handling in multiple subscriber identity devices that overcome or at least lessen the difference between the DSF event behavior compared to single subscriber identity devices.

According to a first aspect of the invention, this is achieved by a downlink signaling counter management method for a communication device. The communication device being adapted to be simultaneously associated with at least two subscriber identities and adapted to simultaneously provide radio receiving capabilities to less than all of the at least two subscriber identities.

The method comprises (for each decoding of a paging block for a subscriber identity) determining whether the paging block decoding was correct and determining whether a previous paging block decoding condition is fulfilled.

If the paging block decoding is correct, the method comprises updating the downlink signaling counter with a first value if the previous paging block decoding condition is fulfilled and updating the downlink signaling counter with a second value if the previous paging block decoding condition is not fulfilled.

If the paging block decoding is not correct and if the paging block decoding was based on a maximum number of paging bursts, the method comprises updating the downlink signaling counter with a third value if the previous paging block decoding condition is fulfilled and updating the downlink signaling counter with a fourth value if the previous paging block decoding condition is not fulfilled.

In some embodiments, the method may further comprise, if the paging block decoding is not correct, determining whether the paging block decoding was based on a maximum number of paging bursts, and if the paging block decoding was not based on a maximum number of paging bursts, storing information indicative of the paging block decoding not being based on a maximum number of paging bursts.

In some embodiments, the method may further comprise, if no paging bursts were allocated for the paging block decoding, storing information indicative thereof.

The absolute value of the second value may exceed the absolute value of the first value and the absolute value of the fourth value may exceed the absolute value of the third value.

The maximum number of paging bursts may be 4, the first value may be 1, the second value may be 2, the third value may be −4 and the fourth value may be −8.

In some embodiments, the previous paging block decoding condition is not fulfilled if:
a previous paging block decoding was not being based on a maximum number of paging bursts and was not correct; or
no paging bursts were allocated for the previous paging block decoding.

The downlink signaling counter may be contained between a lowest value and a highest value. The method may further comprise initiating the downlink signaling counter to the highest value and reporting a downlink signaling failure event if the downlink signaling counter reaches the lowest value.

In some embodiments, the communication device may be adapted to provide the radio receiving capabilities to the at least two subscriber identities according to alternating priorities.

A second aspect of the invention is a computer program product comprising a computer readable medium, having thereon a computer program comprising program instructions, the computer program being loadable into a data-processing unit and adapted to cause the data-processing unit to execute method steps according to the first aspect of the invention when the computer program is run by the data-processing unit.

A third aspect of the invention is a downlink signaling counter management system for a communication device. The communication device being adapted to be simultaneously associated with at least two subscriber identities and adapted to simultaneously provide radio receiving capabilities to less than all of the at least two subscriber identities.

The system comprises a paging decoding unit adapted to decode paging blocks for each of the subscriber identities, a downlink signaling counter adapted to update a DSC value for each of the subscriber identities, and a determination unit.

The determination unit is adapted to, for each of the subscriber identities, determine whether the paging block decoding was correct and determine whether a previous paging block decoding condition is fulfilled.

The determination unit is also adapted to, if the paging block decoding is correct, cause the downlink signaling counter to update with a first value if the previous paging block decoding condition is fulfilled and cause the downlink signaling counter to update with a second value if the previous paging block decoding condition is not fulfilled.

The determination unit is further adapted to, if the paging block decoding is not correct and if the paging block decoding was based on a maximum number of paging bursts, cause the downlink signaling counter to update with a third value if the previous paging block decoding condition is fulfilled and cause the downlink signaling counter to update with a fourth value if the previous paging block decoding condition is not fulfilled.

In some embodiments, the system may further comprise a memory unit. The determination unit may be further adapted to, if the paging block decoding is not correct, determine whether the paging block decoding was based on a maximum number of paging bursts. The memory unit may be adapted to, if the paging block decoding was not based on a maximum number of paging bursts, store information indicative of the paging block decoding not being based on a maximum number of paging bursts.

The determination unit may be further adapted to determine if no paging bursts were allocated for the paging block decoding, and the memory unit may be adapted to store information indicative thereof.

In some embodiments, the system may further comprise a downlink signaling failure event trigger unit adapted to report a downlink signaling failure event if the downlink signaling counter value reaches a lowest value.

A fourth aspect of the invention is a multiple subscriber identity communication device comprising the system according the third aspect of the invention. The multiple subscriber identity communication device may be a dual SIM dual standby (DSDS) communication device.

In some embodiments, the third and fourth aspects of the invention may additionally have features identical with or corresponding to any of the various features as explained above for the first aspect of the invention.

An advantage of some embodiments of the invention is that it is possible to keep the same or similar latency of the DSF event for multiple subscriber identity devices as for single subscriber identity devices.

Another advantage of the invention is that it is possible to have the same or similar DSF even behavior for each of the subscriber identities of a multiple subscriber identity device.

Another advantage of some embodiments of the invention is that it is possible to avoid wrongful occurrence of a DSF event in multiple subscriber identity devices. Thus, according to some embodiments, it is possible to avoid wrongful occurrences of cell reselection, cell search, "No service" procedure, and/or "Limited Service" procedure.

As mentioned before, a cell search may be based on a HPLMN (Home Public Land Mobile Network) neighborhood cell coverage research, comprising e.g. cell synchronization attempt(s) and cell identification procedure(s) to verify whether or not a cell belong to the HPLMN.

BRIEF DESCRIPTION OF THE DRAWINGS

Further objects, features and advantages of the invention will appear from the following detailed description of embodiments of the invention, with reference being made to the accompanying drawings, in which:

FIG. 4 is a block diagram illustrating an example arrangement according to some embodiments of the invention;

FIG. 5 is a schematic drawing illustrating a mobile terminal according to some embodiments of the invention; and FIG. 6 is a schematic drawing illustrating a computer program product according to some embodiments of the invention.

DETAILED DESCRIPTION

In the following, embodiments of the invention will be described comprising downlink signaling counter handling suitable for multiple subscriber identity devices. Embodiments of the invention will be described where the criteria for updating (increasing or decreasing) the DSC and/or the values of the respective updates are adapted. Embodiments of the invention overcome or at least lessen the difference between the DSF event behavior compared to single subscriber identity devices.

As described above in relation to FIGS. 2A and 2C, there may be a complete or partial overlap of paging occasions in multiple subscriber identity scenarios.

In some conditions, a paging block may be correctly decoded even with fewer than 4 paging bursts (e.g. partial decoding). In other conditions, all 4 paging bursts are needed to correctly decode the paging block. The conditions are typically related to reception conditions, which may depend e.g. on the reception power level and the interference level.

Complete and partial paging overlap situations (e.g. those in FIGS. 2A and 2C) may be, at least to some extent, handled by alternating priorities among the SIMs and/or by exploiting partial decoding possibilities. Alternating priorities for paging block reading and decoding for a dual SIM situation may ensure that for each SIM, all 4 bursts will be available for at least one paging block out of two.

Figure 2A:
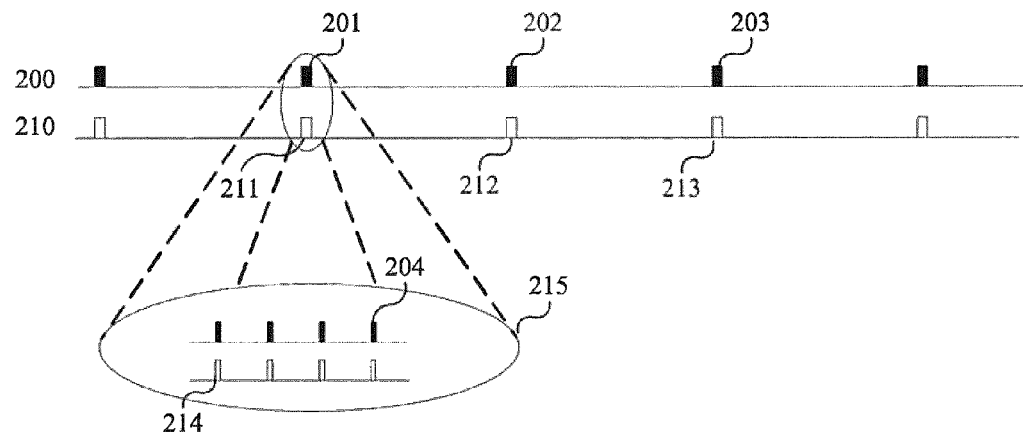
FIG. 2A is a schematic drawing illustrating an example of complete overlap between paging occasions.
Figure 2B:
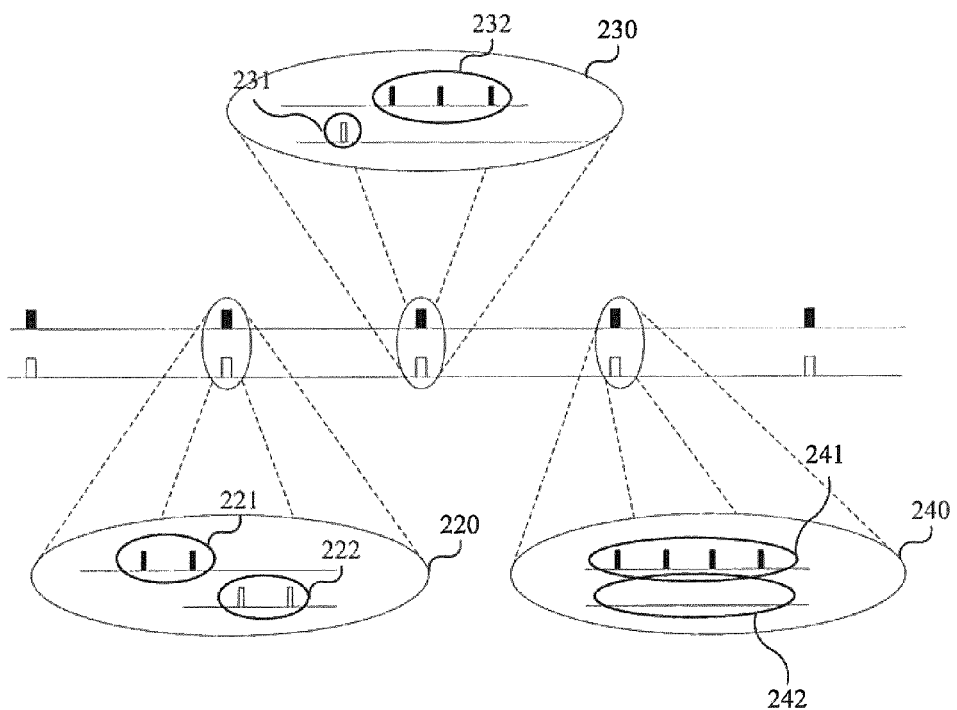
FIG. 2B is a schematic drawing illustrating example ways of handling the complete overlap between paging occasions of FIG. 2A.

FIG. 2B illustrates such an example approach and its result in a complete overlap situation as the one described in FIG. 2A.

At the first paging occasion 220, priority is given to the first SIM and the corresponding partial decoding is successful based on the first 2 paging bursts 221. Since the next two bursts are not needed by the first SIM, they are offered to the second SIM, and partial decoding is attempted based on the last 2 paging bursts 222. This attempt may or may not be successful.

At the second paging occasion 230, priority is given to the second SIM (due to alternating priorities) and the corresponding partial decoding is successful based on the single first paging burst 231. Since the next three bursts are not needed by the second SIM, they are offered to the first SIM, and partial decoding is attempted based on the last 3 paging bursts 232. This attempt may or may not be successful.

At the third paging occasion 240, priority is given to the first SIM (due to alternating priorities) and the corresponding partial decoding is not successful. Thus, the first SIM uses all 4 paging bursts 241 to attempt paging decoding. This attempt may or may not be successful. Since all 4 bursts have been used by the first SIM, there are no bursts 242 offered to the second SIM.

Figure 2C:
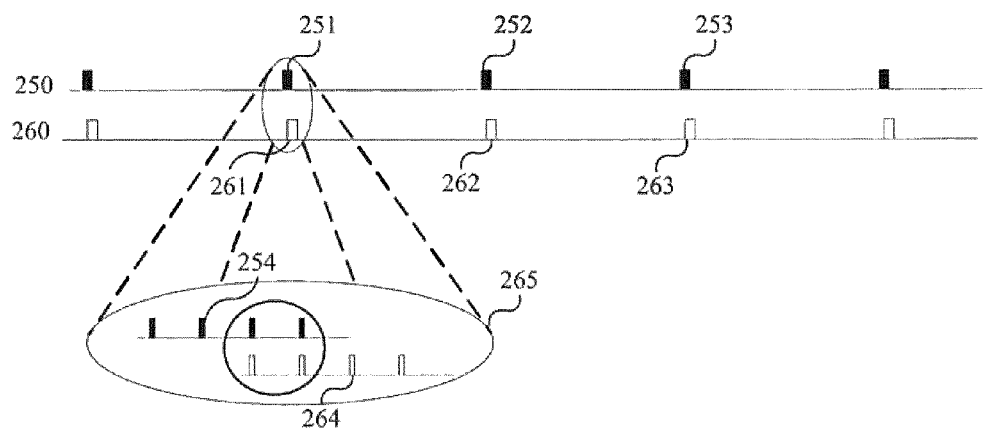
FIG. 2C is a schematic drawing illustrating an example of partial overlap between paging occasions.
Figure 2D:
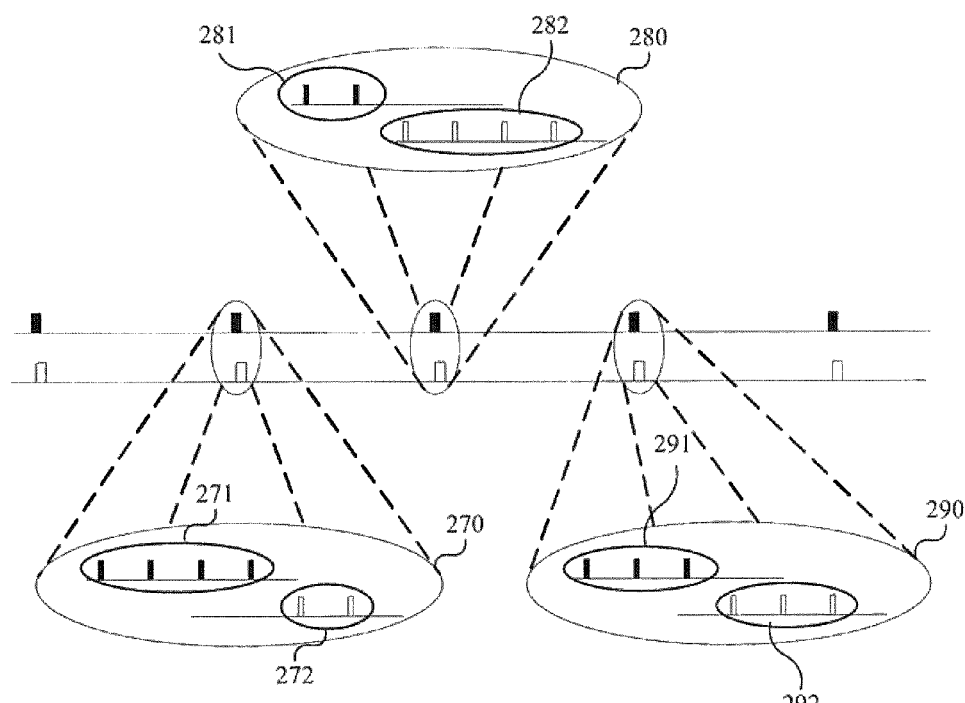
FIG. 2D is a schematic drawing illustrating example ways of handling the partial overlap between paging occasions of FIG. 2C.

FIG. 2D also illustrates an example approach to paging overlap handling and its result in a partial overlap situation as the one described in FIG. 2C.

At the first paging occasion 270, priority is given to the first SIM and the corresponding partial decoding is not successful. Thus, the first SIM uses all 4 paging bursts 271 to attempt paging decoding. This attempt may or may not be successful. Due to the partial overlap there are 2 bursts to be offered to the second SIM, and partial decoding is attempted based on the last 2 paging bursts 272. This attempt may or may not be successful.

At the second paging occasion 280, priority is given to the second SIM (due to alternating priorities). Since the first 2 paging bursts 281 for the first SIM do not overlap with the second SIM, these 2 bursts are offered to the first SIM and decoding is attempted based on the 2 bursts 281. This attempt may or may not be successful. In either situation, no more bursts are offered to the first SIM at this paging occasion due to the alternating priorities. The second SIM uses all 4 paging bursts 282, and decoding is attempted based on the 4 paging bursts 282. This attempt may or may not be successful.

At the third paging occasion 290, priority is given to the first SIM (due to alternating priorities) and the corresponding partial decoding is successful based on the first 3 paging bursts 291. Since the last burst is not needed by the first SIM and due to the partial overlap, there are three bursts to be offered to the second SIM, and partial decoding is attempted based on the last 3 paging bursts 292. This attempt may or may not be successful.

Figure 1:
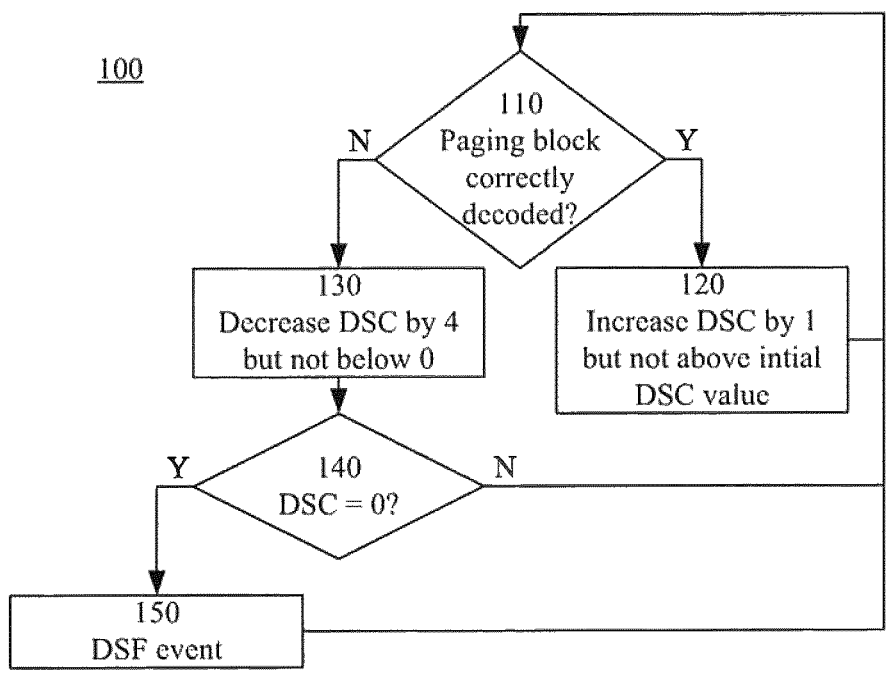
FIG. 1 is a flowchart illustrating method steps according to the prior art.

Thus, when such and similar approaches are used, attempts for partial decoding may be made based on the available number of bursts, which may be less than 4. If such an attempt is unsuccessful, the DSC is decreased with 4 according to the prior art method as presented in FIG. 1, even though a decoding attempt based on all 4 bursts might have been successful. This may lead to the DSC reaching the value 0 prematurely or erroneously.

Assuming the partial overlap example presented in FIG. 2C, and assuming that the conditions are such that 4 bursts are needed to correctly decode the paging blocks, a DSF event occurs whereas it should not occur at all. This is illustrated in Table 1 below, where it is assumed that BS_PA_MFRMS=2 (see e.g. 3GPP TS 45.008 Radio subsystem link control (Release 9) v.9.5.0 (2010-11), section 6.5). It can be seen that with these assumptions, the DSF event occurs 13.6 seconds after the cell (re-)selection, while normally no DSF event should have occurred.

TABLE 1

| | Single-SIM Behavior | | | DSDS with Alternate Priority | | | |
|---|---|---|---|---|---|---|---|
| Time (sec) | Nb Bursts | Paging Decoding | DSC | Nb Bursts | Paging Decoding | DSC | |
| 0.00 | | | 45 | | | 45 | |
| 0.47 | 4 | OK | 45 | 2 | KO | 41 | |
| 0.94 | 4 | OK | 45 | 4 | OK | 42 | |
| 1.41 | 4 | OK | 45 | 2 | KO | 38 | |
| 1.88 | 4 | OK | 45 | 4 | OK | 39 | |
| 2.35 | 4 | OK | 45 | 2 | KO | 35 | |
| 2.82 | 4 | OK | 45 | 4 | OK | 36 | |
| 3.30 | 4 | OK | 45 | 2 | KO | 32 | |
| 3.77 | 4 | OK | 45 | 4 | OK | 33 | |
| 4.24 | 4 | OK | 45 | 2 | KO | 29 | |
| 4.71 | 4 | OK | 45 | 4 | OK | 30 | |
| 5.18 | 4 | OK | 45 | 2 | KO | 26 | |
| 5.65 | 4 | OK | 45 | 4 | OK | 27 | |
| 6.12 | 4 | OK | 45 | 2 | KO | 23 | |
| 6.59 | 4 | OK | 45 | 4 | OK | 24 | |
| 7.06 | 4 | OK | 45 | 2 | KO | 20 | |
| 7.53 | 4 | OK | 45 | 4 | OK | 21 | |
| 8.00 | 4 | OK | 45 | 2 | KO | 17 | |
| 8.47 | 4 | OK | 45 | 4 | OK | 18 | |
| 8.94 | 4 | OK | 45 | 2 | KO | 14 | |
| 9.41 | 4 | OK | 45 | 4 | OK | 15 | |
| 9.89 | 4 | OK | 45 | 2 | KO | 11 | |
| 10.36 | 4 | OK | 45 | 4 | OK | 12 | |
| 10.83 | 4 | OK | 45 | 2 | KO | 8 | |
| 11.30 | 4 | OK | 45 | 4 | OK | 9 | |
| 11.77 | 4 | OK | 45 | 2 | KO | 5 | |
| 12.24 | 4 | OK | 45 | 4 | OK | 6 | |
| 12.71 | 4 | OK | 45 | 2 | KO | 2 | |
| 13.18 | 4 | OK | 45 | 4 | OK | 3 | |
| 13.65 | 4 | OK | 45 | 2 | KO | 0 | DSDS DSF event |

Assuming the complete overlap example presented in FIG. 2A, assuming that the conditions are such that 4 bursts are needed to correctly decode the paging blocks for one of the SIMs, and assuming that all paging block decoding attempts are unsuccessful for the other SIM, a DSF event occurs later than it should for the other SIM. This is illustrated in Table 2 below, where it is assumed that BS_PA_MFRMS=2. It can be seen that with these assumptions, the DSF event occurs 11.3 seconds after the cell (re-)selection when it should have occurred after 5.65 seconds. This is due to the fact that the DSC decrease is not triggered when no bursts are read, as no paging block decoding is performed then.

TABLE 2

| | Single-SIM Behavior | | | DSDS with Alternate Priority | | | |
|---|---|---|---|---|---|---|---|
| Time (sec) | Nb Bursts | Paging Decoding | DSC | Nb Bursts | Paging Decoding | DSC | |
| 0.00 | | | 45 | | | 45 | |
| 0.47 | 4 | KO | 41 | 0 | NO | 45 | |
| 0.94 | 4 | KO | 37 | 4 | KO | 41 | |
| 1.41 | 4 | KO | 33 | 0 | NO | 41 | |
| 1.88 | 4 | KO | 29 | 4 | KO | 37 | |
| 2.35 | 4 | KO | 25 | 0 | NO | 37 | |
| 2.82 | 4 | KO | 21 | 4 | KO | 33 | |
| 3.30 | 4 | KO | 17 | 0 | NO | 33 | |
| 3.77 | 4 | KO | 13 | 4 | KO | 29 | |
| 4.24 | 4 | KO | 9 | 0 | NO | 29 | |
| 4.71 | 4 | KO | 5 | 4 | KO | 25 | |
| 5.18 | 4 | KO | 1 | 0 | NO | 25 | |
| 5.65 | 4 | KO | 0 | 4 | KO | 21 | Single |
| 6.12 | 4 | KO | 0 | 0 | NO | 21 | SIM |
| 6.59 | 4 | KO | 0 | 4 | KO | 17 | DSF |
| 7.06 | 4 | KO | 0 | 0 | NO | 17 | event |
| 7.53 | 4 | KO | 0 | 4 | KO | 13 | |
| 8.00 | 4 | KO | 0 | 0 | NO | 13 | |
| 8.47 | 4 | KO | 0 | 4 | KO | 9 | |
| 8.94 | 4 | KO | 0 | 0 | NO | 9 | |
| 9.41 | 4 | KO | 0 | 4 | KO | 5 | |
| 9.89 | 4 | KO | 0 | 0 | NO | 5 | |
| 10.36 | 4 | KO | 0 | 4 | KO | 1 | |
| 10.83 | 4 | KO | 0 | 0 | NO | 1 | |
| 11.30 | 4 | KO | 0 | 4 | KO | 0 | DSDS DSF event |

Embodiments of the invention aim at keeping the same latency of any DSF event occurrence for each SIM of a multi-SIM device as for a single-SIM device. Furthermore, embodiments of the invention aim at avoiding a DSF event to occur for a multi-SIM device if it would not for a single-SIM device. Embodiments of the invention also aim at avoiding a situation where no DSF event occurs for a multi-SIM device if it would for a single-SIM device.

In embodiments of the invention, the DSC updates are adjusted to suit the multi-SIM and paging collision situation. The adjustments may comprise one or more of: an adjustment of the condition for when a DSC update should occur and an adjustment of the value of the DSC update. The condition for when a DSC update should occur may depend on whether or not a paging decoding was successful and on how many bursts where available for the decoding (indicating the reliability of the current paging block decoding result). The value of the DSC update may depend on (in addition to whether or not the paging decoding was successful as in the prior art) whether or not a previous paging decoding was successful and how many bursts where available for that previous decoding.

Figure 3:
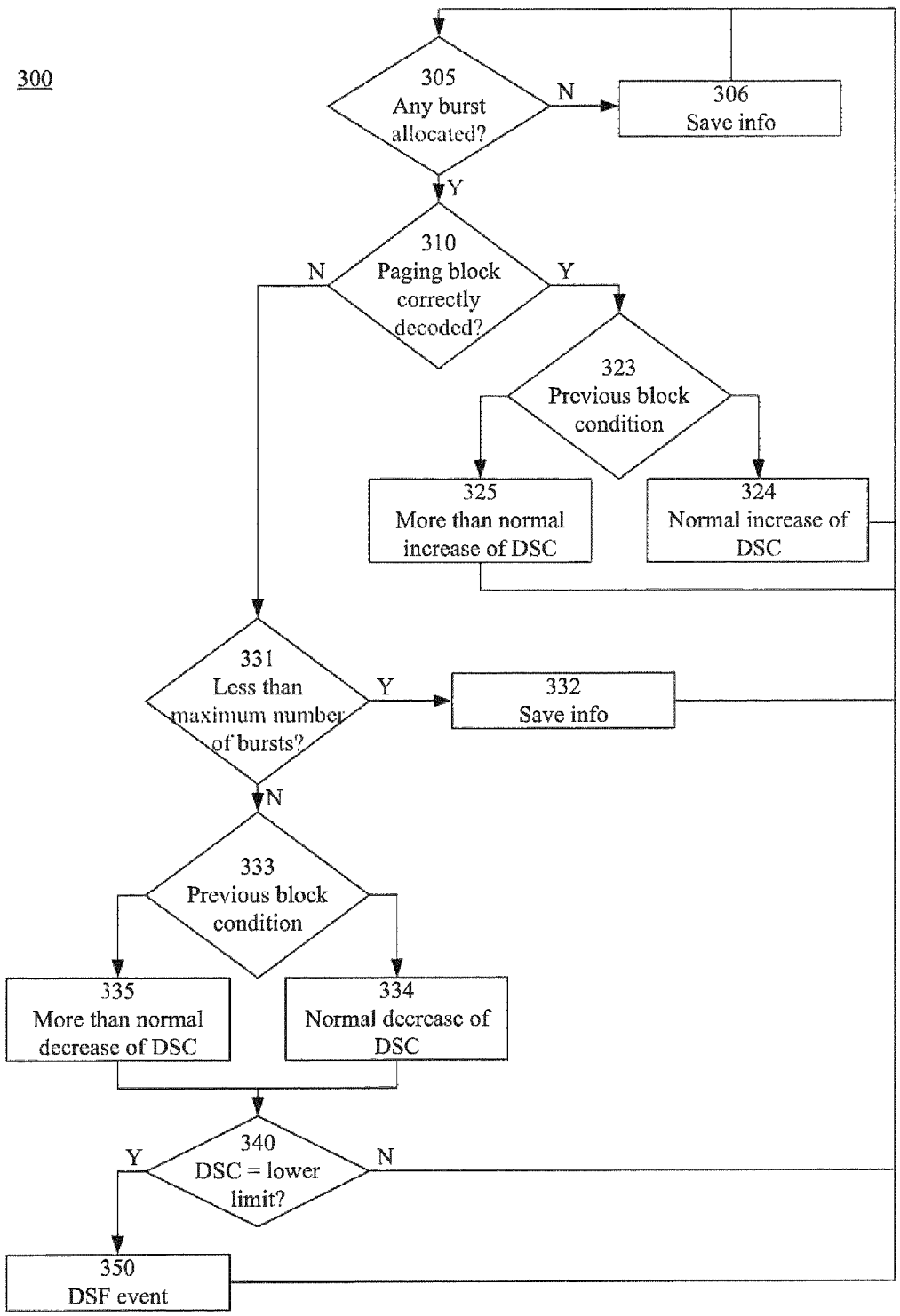
FIG. 3 is a flowchart illustrating example method steps according to some embodiments of the invention.

FIG. 3 illustrates an example method 300 of DSC handling in accordance to some embodiments of the invention.

If no bursts are allocated to a SIM at a paging occasion (NO path out of block 305), that information is remembered in step 306 even if no decoding attempt is made in that situation. This information may be used in decision blocks 323 and/or 333 as will be described in the following. Then the process returns to step 305. If one or more bursts were allocated (YES path out of step 305) the method continues to step 310.

In step 310, it is determined whether or not the paging block reading was successful (e.g. if the paging block was correctly decoded).

If the paging block reading was successful (YES path out of block 310) then it is determined in step 323 whether a previous block condition is fulfilled. The previous block condition could, for example, comprise that no bursts was allocated for decoding of a previous block or that the previous block was badly decoded based on less than the maximum number of bursts (e.g. 4), or a combination of both these conditions.

If the condition is not fulfilled (e.g. if the previous block was successfully decoded or if it was badly decoded based on the maximum number of burst) the DSC is updated with a normal value (e.g. increased by 1) in step 324 and the method returns to step 305 for the next paging block reading.

If the condition is fulfilled the DSC is updated with a value which has a higher absolute value than the absolute value of the normal value (e.g. increased by 2) in step 325 and the method returns to step 305 for the next paging block reading. It is considered that the correct decoding result of the current paging block induces a higher probability that the previous paging block would have been decoded correctly if it had the maximum number of bursts available.

Typically, the DSC is not increased above a maximum value through the update steps 324 or 325. The maximum value is typically equal to the specific value to which the DSC is initiated as described above.

If the paging block reading was not successful (NO path out of block 310) then it is determined in step 331 if there was less than the maximum number (4) of bursts available for the decoding.

If so, that information is remembered in step 332, no DSC update is made, and the method returns to step 305 for the next paging block reading. Since the probability to correctly decode the paging block is reduced with less than the maximum number of bursts, this result is not reliable enough to base a DSC update on and therefore no DSC update is made in the step 332 path. If priority alternation is applied, the next paging block for this SIM will be given priority and then a maximum number of bursts will be allocated to guarantee a reliable paging block decoding result, which the DSC update can be based on. If it is determined in step 331 that the maximum number of bursts was available for the decoding, the process continues to step 333.

In step 333 is determined in whether a previous block condition is fulfilled. Typically, but not necessarily, this is the same condition as in step 323. As in step 323, the previous block condition could, for example, comprise that no bursts was allocated for decoding of a previous block or that the previous block was badly decoded based on less than the maximum number of bursts (e.g. 4), or a combination of both these conditions.

If the condition is not fulfilled (e.g. if the previous block was successfully decoded or if it was badly decoded based on the maximum number of burst) the DSC is updated with a normal value (e.g. decreased by 4) in step 334 and the method continues to step 340.

If the condition is fulfilled the DSC is updated with a value which has a higher absolute value than the absolute value of the normal value (e.g. decreased by 8) in step 335 and the method continues to step 340. It is considered that the bad decoding result of the current paging block points to a high probability that the previous paging block would also have been badly decoded even if it had had the maximum number of bursts available.

Typically, the DSC is not decreased below a minimum value through the update steps 334 or 335. The minimum value is typically equal to 0.

Then, in step 340, it is determined if the DSC has reached a lower threshold (e.g. the value 0). If it has not (NO path out of step 340), the method returns to step 305 for the next paging block reading. If DSC has reached the lower threshold (YES path out of step 340), then a Downlink Signaling Failure (DSF) event is triggered in step 350, and the process returns to step 305.

As long as a UE is camped on a cell, it typically always tries to read the paging blocks. A cell reselection or a cell search could be triggered by a DSF as described above.

A cell reselection will typically start a new paging reading algorithm and a new DSC algorithm, for example in accordance with the method 300.

If no cell reselection is triggered as a result of the DSF event (e.g. because no suitable cell is found, or for other reasons), the paging blocks are still read and the same DSC algorithm will typically continue to run. Hence, a further bad decoding will generate a new DSF event, and a further good decoding will generate an increase of the DSC.

It is to be noted that the update values of 1, 2, −4 and −8 are merely examples, and other values may be equally applicable in some embodiments. It should also be noted that the increasing and decreasing may be interchanged, as well as the relations between the "maximum" value, the "minimum" value and the lower threshold may be altered to suit a particular situation without departing from the scope of the invention.

The method described above in connection to FIG. 3 is designed to be used for a dual SIM device with alternation of SIM priority for paging reading in case of collision.

For a multi-SIM device with more than 2 SIMs, at least some steps should be performed differently.

For a 3 SIM situation for example, if the 3 paging occasions are in conflict each SIM will have the highest priority in one third of the paging occasions. Thus, for 2 consecutive paging occasions a paging reading and decoding might be attempted with less than 4 bursts. Similarly, for a N SIM situation, if the N paging occasions are all in conflict each SIM will have the highest priority in 1 out of N of the paging occasions. Thus, for N−1 consecutive paging occasions a paging reading and decoding might be attempted with less than 4 bursts.

This could imply some significant delay in the DSF event triggering and the probabilities defined in step 325 and 335 could be significantly reduced.

Thus, it is clear that some steps of FIG. 3 should be performed differently than described above for a situation with more than 2 SIMs having colliding paging occasions.

For example, in the determination in steps 323 and 333 whether a previous block condition is fulfilled, the previous block condition should typically be adjusted. For example, the previous block condition could take more that the directly previous block into account (e.g. N−1 previous blocks for the N SIM situation).

The updating step 325 should typically also be adjusted. For example, the value which has a higher absolute value than the absolute value of the normal value might be set to an increase of N for the N SIM situation.

Similarly, the updating step 335 should typically be adjusted. For example, the value which has a higher absolute value than the absolute value of the normal value might be set to a decrease of 4*N for the N SIM situation.

Repeating the experiments reported in Tables 1 and 2 above, but applying the method of FIG. 3, it is observed that the DSDS DSF events then show the same behavior as the single SIM DSF events.

FIG. 4 illustrates a downlink signaling counter management arrangement 400 according to some embodiments of the invention. The arrangement 400 may, for example, be adapted to perform method steps in accordance with method 300 as described in connection to FIG. 3.

The arrangement 400 is suitable for inclusion in a multiple subscriber identity wireless communication terminal adapted to simultaneously provide radio receiving capabilities to less than all of the subscriber identities. The arrangement is adapted to be associated with two or more subscriber identities, e.g. in the form of SIM cards SIM1 410a and SIM2 410b. It is also adapted to be connected to other processing unit(s) OPU, 460 and a baseband unit BB, 480, which in turn is connected to a radio frequency unit RF, 490.

The arrangement 400 comprises a paging decoding unit PDU, 420, a determination unit DU, 430, a downlink signaling counter DSC, 440, and a downlink signaling failure event trigger unit DSF, 450. The arrangement may also comprise a memory or register MEM, 470. In some embodiments, the memory 470 is not comprised in the arrangement as shown in FIG. 4.

The units 410a, 410b, 460, 480 and 490 operate conventionally as can be easily understood by the skilled person, according to already known or future algorithms and having already known or future structural properties. Therefore, they will not be described further.

The paging decoding unit 420 is adapted to decode paging blocks for each of the subscriber identities. The decoding may be based on a maximum or less than maximum number of burst, the decoding may be successful or not and if successful it may be partial or not. The result of the paging decoding unit 420 is forwarded to the other processing units 460 and is handled there in a conventional manner.

Results (at least in the form of an indication of whether or not the decoding was successful and the number of bursts available) of the paging decoding unit 420 is also forwarded to the determination unit 430, which performs determinations similar to steps 310, 323, 331 and 333 of FIG. 3.

Based on the determinations of the determination unit 430, the DSC 440 is updated (similarly to steps 324, 325, 334 or 335 of FIG. 3, e.g. by inputting an update value to the DSC 440) and/or an indication is stored (similarly to step 332 of FIG. 3) in the memory 470.

When the DSC 440 reaches a lower threshold the downlink signaling failure event trigger unit 450 is notified and alerts the other processing units 460 of the DSF event, and it is handled therein in a conventional manner. Thus, in this implementation a determination similar to step 340 of FIG. 3 is performed in the DSC unit 440. In, other implementations the determination similar to step 340 of FIG. 3 may be performed in e.g. the decision unit 430 or in the DSF unit 450 instead.

In some embodiments, there is not a separate DSF event trigger unit 450, but the trigger is generated directly by the DSC 440.

One DSC value is kept for each subscriber identity. This may be solved by having a separate DSC unit 440 for each subscriber identity or by having a single shared DSC unit 440 and saving the respective DSC values in separate locations. For example, and a memory location (e.g. in memory unit 470) or register may be available for each subscriber identity. The other units can be, but do not have to be, shared between the subscriber identities.

FIG. 5 illustrates an example mobile terminal 500. The mobile terminal may be connected, through a radio link, to a network. The mobile terminal may comprise an arrangement for downlink signaling counter handling according to embodiments of the invention, for example the arrangement described in connection to FIG. 4.

The mobile terminal 500 is illustrated as a mobile telephone in a schematic front view. The mobile terminal may further comprise one or more antennas and a man-machine interface for operating the mobile terminal (e.g. a display, a keypad, a loudspeaker, and a microphone).

The example mobile terminal 500 is adapted to connect to one or more mobile telecommunication network via a wireless link. A user of the mobile terminal may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 500 and the network may be compliant with at least one mobile telecommunication standard.

The mobile terminal 500 is adapted to be simultaneously associated with at least two subscriber identities and adapted to simultaneously provide radio receiving capabilities to less than all of the at least two subscriber identities.

The described embodiments of the invention and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, a notebook, a USB-stick, a plug-in card, an embedded drive, a mobile gaming device, or a (wrist) watch.

According to some embodiments of the invention, a computer program product (as exemplifier in FIG. 6) comprises a computer readable medium such as, for example, a diskette or a CD-ROM 600. The computer readable medium may have stored thereon a computer program comprising program instructions. The computer program may be loadable into a data-processing unit 630, which may, for example, be comprised in a mobile terminal 610. When loaded into the data-processing unit 630, the computer program may be stored in a memory 620 associated with or integral to the data-processing unit 630. According to some embodiments, the computer program may, when loaded into and run by the data-processing unit 630, cause the data-processing unit 630 to execute method steps according to, for example, the methods shown in FIG. 3.

It should be noted that embodiments of the invention are equally applicable to dual SIM devices and multiple SIM devices as have been elaborated on above.

Also, even though the subscriber identities typically reside in local memory areas of SIM cards which are physically inserted into corresponding SIM card readers in a mobile terminal; this must not be the case in all embodiments. In some embodiments, the subscriber identities may be provided to the mobile terminal in the form of a SIM software application executed in the terminal, and/or as a virtual SIM which is "stolen" or "borrowed" from another device and is rendered accessible to the terminal by way of a (wireless or other) interface.

Furthermore, it should be noted that embodiments of the invention are equally applicable to mobile terminals as to stationary devices associated with a cellular telecommunication network (e.g. routers, power consumption meters, home alarms, etc). Such stationary devices are configured to be connected to a cellular communication network and are, when connected, seen as terminals by the network.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A downlink signaling counter management method for a communication device adapted to be simultaneously associated with at least two subscriber identities and adapted to simultaneously provide radio receiving capabilities to less than all of the at least two subscriber identities, the method comprising:
for each decoding of a paging block for a subscriber identity,
determining whether a paging block decoding is correct;
determining whether a previous paging block decoding condition is fulfilled;
when it is determined that the paging block decoding is correct and that the previous paging block decoding condition is fulfilled, adjusting the downlink signaling counter by a first value;
when it is determined that the paging block decoding is correct and that the previous paging block decoding condition is not fulfilled, adjusting the downlink signaling counter by a second value;
when it is determined that the paging block decoding is not correct, that the paging block decoding was based on a maximum number of paging bursts, and that the previous paging block decoding condition is fulfilled, adjusting the downlink signaling counter by a third value; and
when it is determined that the paging block decoding is not correct, that the paging block decoding was based on a maximum number of paging bursts, and that the previous paging block decoding condition is not fulfilled, adjusting the downlink signaling counter by a fourth value,
wherein the adjustment by the first and second values adjusts the downlink signaling counter away from a condition for triggering a downlink signaling failure event and the adjustment by the third and fourth values adjusts the downlink signaling counter towards the condition for triggering the downlink signaling failure event.

2. The method of claim 1, further comprising:
when the paging block decoding is not correct, determining whether the paging block decoding was based on a maximum number of paging bursts, and
when it is determined that the paging block decoding was not based on a maximum number of paging bursts, storing information indicative of the paging block decoding not being based on a maximum number of paging bursts.

3. The method of claim 1, further comprising:
when no paging bursts were allocated for the paging block decoding, storing information indicative of that no paging bursts were allocated.

4. The method of claim 1, wherein an absolute value of the second value exceeds an absolute value of the first value, and an absolute value of the fourth value exceeds an absolute value of the third value.

5. The method of claim 1, wherein a maximum number of paging bursts is 4, the first value is 1, the second value is 2, the third value is $-4$ and the fourth value is $-8$.

6. The method of claim 1, wherein the previous paging block decoding condition is not fulfilled if:
a previous paging block decoding was not based on a maximum number of paging bursts and was not correct; or
no paging bursts were allocated for the previous paging block decoding.

7. The method of claim 1, wherein the downlink signaling counter has values between a lowest value and a highest value.

8. The method of claim 7, further comprising:
initiating the downlink signaling counter to the highest value; and
reporting the downlink signaling failure event if the downlink signaling counter reaches the lowest value.

9. The method of claim 1, wherein the communication device is adapted to provide the radio receiving capabilities to the at least two subscriber identities according to alternating priorities.

10. A non-transitory computer readable medium storing a computer program product including program instructions, the computer program being loadable into a data-processing unit, the data processing unit executing the method according to claim 1 when the computer program is run by the data-processing unit.

11. A downlink signaling counter, DSC, management system for a communication device adapted to be simultaneously associated with at least two subscriber identities and adapted to simultaneously provide radio receiving capabilities to less than all of the at least two subscriber identities, the system comprising:
a paging decoding unit configured to decode paging blocks for each of the subscriber identities;
a downlink signaling counter configured to update a DSC value for each of the subscriber identities; and
a determination unit configured, for each of the subscriber identities,
to determine whether a paging block decoding was correct;
to determine whether a previous paging block decoding condition is fulfilled;

when it is determined that the paging block decoding is correct and that the previous paging block decoding condition is fulfilled, to cause the downlink signaling counter unit to update the DSC value with a first value;

when it is determined that the paging block decoding is correct and that the previous paging block decoding condition is not fulfilled, to cause the downlink signaling counter to update the DSC value with a second value;

when it is determined that the paging block decoding is not correct, that the paging block decoding was based on a maximum number of paging bursts, and that the previous paging block decoding condition is fulfilled to cause the downlink signaling counter to update the DSC value with a third value; and when it is determined that the paging block decoding is not correct, that the paging block decoding was based on a maximum number of paging bursts, and that the previous paging block decoding condition is not fulfilled to cause the downlink signaling counter to update the DSC value with a fourth value, wherein the adjustment by the first and second values adjusts the downlink signaling counter away from a condition for triggering a downlink signaling failure event and the adjustment by the third and fourth values adjusts the downlink signaling counter towards the condition for triggering the downlink signaling failure event.

12. The system of claim 11, further comprising:

a memory unit, wherein the determination unit is further configured to determine whether the paging block decoding was based on a maximum number of paging bursts if the paging block decoding is not correct, and the memory unit is configured to store information indicative of the paging block decoding not being based on a maximum number of paging bursts if the paging block decoding was not based on a maximum number of paging bursts.

13. The system of claim 12, wherein the determination unit is further configured to determine whether no paging bursts were allocated for the paging block decoding, and the memory unit is configured to store information indicative of no paging bursts being allocated if no paging bursts were allocated.

14. The system of claim 11, further comprising a downlink signaling failure event trigger unit configured to report a downlink signaling failure event if the DSC value reaches a lowest value.

15. A multiple subscriber identity communication device comprising the system according to claim 11.

16. The system of claim 11, wherein an absolute value of the second value exceeds an absolute value of the first value, and an absolute value of the fourth value exceeds an absolute value of the third value.

17. The system of claim 11, wherein a maximum number of paging bursts is 4, the first value is 1, the second value is 2, the third value is −4 and the fourth value is −8.

18. The system of claim 11, wherein the downlink signaling counter has values between a lowest value and a highest value.

19. The system of claim 18, wherein the system initiates the downlink signaling counter to the highest value and reports the downlink signaling failure event if the downlink signaling counter reaches the lowest value.

\* \* \* \* \*